US008831223B2

(12) United States Patent
Bolin et al.

(10) Patent No.: US 8,831,223 B2
(45) Date of Patent: Sep. 9, 2014

(54) ABSTRACTION FUNCTION FOR MOBILE HANDSETS

(75) Inventors: Johan Bolin, Spånga (SE); Karl Torbjörn Wigren, Uppsala (SE); Per Willars, Vaxholm (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 1382 days.

(21) Appl. No.: 12/346,066

(22) Filed: Dec. 30, 2008

(65) Prior Publication Data

US 2009/0204807 A1 Aug. 13, 2009

Related U.S. Application Data

(60) Provisional application No. 61/022,437, filed on Jan. 21, 2008.

(51) Int. Cl.
| | |
|---|---|
| *G06F 21/00* | (2013.01) |
| *H04W 4/02* | (2009.01) |
| *H04W 4/20* | (2009.01) |
| *H04L 29/08* | (2006.01) |
| *H04L 29/06* | (2006.01) |

(52) U.S. Cl.
CPC ............. *H04L 63/0428* (2013.01); *H04W 4/20* (2013.01); *H04L 63/061* (2013.01); *H04W 4/02* (2013.01); *H04L 67/18* (2013.01); *H04L 67/04* (2013.01); *H04L 63/107* (2013.01)
USPC ............. 380/258; 380/247; 713/166; 726/26; 455/434

(58) Field of Classification Search
USPC ............ 713/150, 155, 189, 193; 726/2–5, 21, 726/26, 27, 29; 380/28, 29, 247; 455/403, 455/410, 422.1, 442, 456.1
See application file for complete search history.

(56) References Cited

U.S. PATENT DOCUMENTS 5,577,122 A * 11/1996 Schipper et al. ................ 380/28
6,124,799 A    9/2000 Parker
(Continued)

FOREIGN PATENT DOCUMENTS

CN    1732674 A    2/2006
EP    1406423 A1   4/2004
(Continued)

OTHER PUBLICATIONS

ISR & WO from corresponding International Application No. PCT/SE2008/051576, issued on Apr. 27, 2009.
(Continued)

*Primary Examiner* — Gilberto Barron, Jr.
*Assistant Examiner* — Abdulhakim Nobahar
(74) *Attorney, Agent, or Firm* — Patent Portfolio Builders PLLC

(57) ABSTRACT

Handset, computer software and method for protecting sensitive network information, available in the handset, from disclosure to an unauthorized server, by using an abstraction function module, the handset being connected to a network. The method includes receiving at the abstraction function module an encoding key from an abstraction server; receiving at the abstraction function module a request from a client or application for providing the sensitive network information from a control plane module of the handset, wherein the client or application resides in a user plane module, which is different from the control plane module, the sensitive network information is stored in the control plane module of the handset, and both the control plane module and the user plane module reside in the handset; retrieving by the abstraction function module the requested sensitive network information from the control plane module; encrypting, by the abstraction function module, the retrieved sensitive network information based on the received encoding key; and providing the encrypted sensitive network information to the client or application in the user plane module.

20 Claims, 8 Drawing Sheets

(56) References Cited

U.S. PATENT DOCUMENTS

| | | |
|---|---|---|
| 6,289,450 B1 | 9/2001 | Pensak et al. |
| 7,003,113 B1 | 2/2006 | Yanase |
| 7,149,532 B2 | 12/2006 | Akama |
| 7,466,674 B2 | 12/2008 | Okagawa et al. |
| 2004/0236589 A1 | 11/2004 | Takahashi |
| 2006/0046747 A1* | 3/2006 | Abraham et al. ............ 455/456.6 |
| 2006/0212721 A1* | 9/2006 | Sutardja ......................... 713/193 |
| 2006/0272027 A1* | 11/2006 | Noble ............................... 726/27 |
| 2007/0155401 A1 | 7/2007 | Ward |
| 2007/0171857 A1* | 7/2007 | Wang et al. ..................... 370/328 |
| 2007/0258591 A1* | 11/2007 | Terry et al. ..................... 380/247 |
| 2007/0275732 A1* | 11/2007 | Jethwa et al. ................ 455/456.1 |
| 2008/0192925 A1* | 8/2008 | Sachs et al. ...................... 380/29 |
| 2008/0305792 A1* | 12/2008 | Khetawat et al. ........... 455/435.1 |

FOREIGN PATENT DOCUMENTS

| | | |
|---|---|---|
| JP | H11-501182 A | 1/1999 |
| JP | 2001-033537 A | 2/2001 |
| JP | 2003-296279 A | 10/2003 |
| JP | 2004-112727 A | 4/2004 |
| JP | 2007-019809 A | 1/2007 |
| WO | 03/017159 A1 | 2/2003 |
| WO | 03/079701 A1 | 9/2003 |
| WO | 2004/062243 A2 | 7/2004 |
| WO | 2007130637 A2 | 11/2007 |
| WO | 2007147345 A1 | 12/2007 |

OTHER PUBLICATIONS

Chinese First Office Action issued Aug. 28, 2012, in related Chinese Application No. 200880125265.7.

* cited by examiner

ABSTRACTION FUNCTION FOR MOBILE HANDSETS

RELATED APPLICATION

This application is related to, and claims priority from, U.S. Provisional Patent Application Ser. No. 61/022,437, filed on Jan. 21, 2008, entitled "Network Abstractions and Hiding Functions for Mobile Devices" to J. Bolin et al., the entire disclosure of which is incorporated here by reference.

TECHNICAL FIELD

This application is related, generally, to communications systems, devices and methods and, more specifically, to mobile devices, services and software for protecting sensitive information from being disclosed to unauthorized third parties.

BACKGROUND

Mobile phones, and services on mobile handsets (mobile handset also refers to embedded devices in e.g. PCs, laptops, vehicles etc.) have had a fantastic evolution during the last decade. When 3GPP standardized GSM, and later 3G during the late 1980's and 1990's, circuit switched telephony and later Short Message Service (SMS) were mainly the only services available. Since then, mobile handsets and networks have evolved to create powerful devices capable of running both local applications and browser based services, connected to a network providing a bandwidth high enough for TV and interactive multimedia. With the increasing bandwidth, and need to provide a feasible technical platform and transport technology for multimedia services, packet-switched networks, e.g., using Internet Protocol (IP) as the fundamental technology, are becoming the dominating platforms for mobile services. There are a number of reasons why this trend is being supported by most actors in the communications business. One reason is that third parties will start to develop applications for such systems, and just as in the case with Internet, this will likely be a key to the expected success of next generation technologies. Another reason is that IP provides a technology platform where it is cheaper to deploy functionality. This is to a large extent due to economy of scale, as technology also used by the IT industry is cheaper than traditional telecom technology.

Additionally, with the increasing bandwidth, advanced mobile handsets having IP connectivity, a functionality that was previously implemented as a tightly integrated functionality in the operators' networks with so-called "thin" (e.g., relatively limited processing and/or memory resource) clients and using control channels for communication, are available as applications located in the IP domain in the operators' network (or even outside of their networks), and with a relatively "thicker" (e.g., having relatively more resources) client on the handset. In other words, the conventional thin clients were limited in their capabilities and thus, the logic in the service relied on network and/or server and proxy side instead of relying on the mobile handset. Typical example of the thin clients is the traditional browsers and/or SMS/MMS based services. However, with the development of the more advanced mobile handsets, the thicker clients, i.e., Java/Symbian/iPhone applications, have more of the logics performed in the client and not in the network and/or server. This is also true for the next generation web environments with more advanced browsers, for example Google Gears and Android. In order for these "thicker" clients to communicate with servers in the network, there is often a need to transfer information therebetween, e.g., information regarding the network capabilities and/or the native functionality in the handset, and there arises, therefore, a need for interfaces and protocols which enable the exchange of such information. This functionality and information is, to a large extent, what is often referred to as the "control plane" of a communication system, while the communications between a client associated with the handset and a server in the network, e.g., based on a packet-based technology such as IP, is usually referred to as the "user plane".

There are several interfaces which have the capability to obtain data about the native functionality of the handset and network information stored in the control plane, in the handset, which an operator would not like to share with an unauthorized user or server. Such interfaces are based on operating system (OS), which typically provides most of the native functionality that is available in the handset. Examples of OS are Symbian, Nokia Series 60, Windows Mobile and Linux. These OSs may provide interfaces for services and information that are available in the control plane. Examples of such services and information include Call Control, SMS/MMS services, as well as network information, e.g., base station ID to which a handset is currently attached, neighbor list and active/passive set. An active set includes 3G base stations that are candidates for soft handover and the handset decoded the pilots of these base stations in order to be able to perform the handover. A passive set includes 3G base stations that are heard by the handset but are not candidates for soft handover. The handset does not decode these pilots to the same degree as for the active set. In addition to the interfaces provided by the OS, Java (J2ME) or other run time environments also provide a wide set of standardized interfaces in which a Java application may obtain access to the services and information from the control plane.

On the other hand, since the user plane based services typically mean lower investment cost and shorter time to market, the Open Mobile Alliance (OMA) has standardized service enablers based on user plane signaling. One example of a user plane based service is the user plane based positioning standardized in OMA Secure User Plane Location (SUPL). In SUPL, a SUPL client in the terminal may access network information and positioning capability. The client may communicate with a SUPL Server using IP and a provisioned IP address.

This type of architecture raises certain issues and challenges. As the interfaces to the control plane provide the user plane services with a mechanism to obtain information from the control plane, this information can be exported to entities outside of the operators' domain. However, since some of the information from the control plane may be sensitive and can be abused by entities outside the operator, these interfaces may introduce a commercial, and sometimes a security, risk for the operator. As various services and clients need the information provided by these interfaces and thus, the information has to be supplied to the legitimate services and/or clients. Such legitimate services and/or clients are those, for example, that have established an agreement with the operator for receiving sensitive network information. One example of such sensitive network information is the Cell-ID and also the neighbor list, i.e., a list including neighbor base stations and/or cells of a given cell. For services such as OMA SUPL positioning and IP Multimedia Subsystem services, the user plane clients need the information from the control plane in order to work properly. Thus, hiding the information from the control plane from everybody except the operator is not a solution.

When information such as the Cell-ID is available to applications in the user plane, other actors than the operator can monitor and register the information and use it to compete with the operator, for example, to gain business advantages. One example of such competitive use is that of independent actors (not related or in a relationship with the operator) providing user positioning services and statistics, using the operator's infrastructure. Another competitive use is that of competing operators monitoring, and keeping registers of, competing operator's network infrastructure for business intelligence. In addition to these commercial examples, there are also some countries in which the information, such as cell planes, is supposed to be kept secret due to national security reasons. As the information as such, e.g. the Cell-ID, often is used in a large number of nodes and systems in the operators network (e.g. access and routing control, user management and charging etc.), this information should be properly controlled by the operator to be available to the permitted services and/or clients and also to the equipment within the network.

Accordingly, it would be desirable to provide devices, systems and methods that avoid the afore-described problems and drawbacks.

BRIEF DESCRIPTION OF THE DRAWINGS

The accompanying drawings illustrate exemplary embodiments of the present invention, wherein.

SUMMARY

Figure 1:
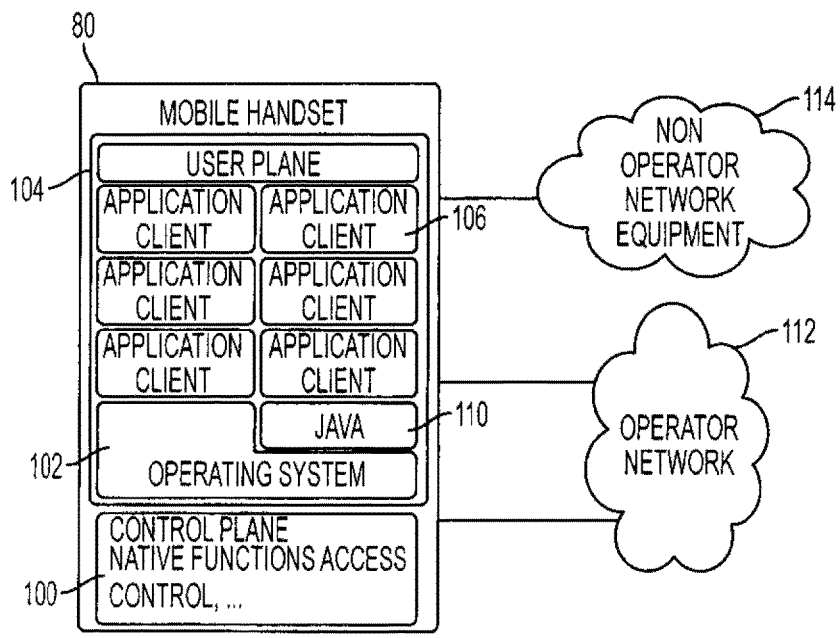
FIG. 1 depicts a conceptual view of a mobile handset with a control plane and user plane.

According to an exemplary embodiment, there is a method for protecting sensitive network information, available in a handset, from disclosure to an unauthorized server, by using an abstraction function module, the handset being connected to a network. The method includes receiving at the abstraction function module an encoding key from an abstraction server; receiving at the abstraction function module a request from a client or application for providing the sensitive network information from a control plane module of the handset, wherein the client or application resides in a user plane module, which is different from the control plane module, the sensitive network information is stored in the control plane module of the handset, and both the control plane module and the user plane module reside in the handset; retrieving by the abstraction function module the requested sensitive network information from the control plane module; encrypting, by the abstraction function module, the retrieved sensitive network information based on the received encoding key; and providing the encrypted sensitive network information to the client or application in the user plane module.

According to another exemplary embodiment, there is a handset configured to protect sensitive network information, available in the handset, from disclosure to an unauthorized server, by using an abstraction function module, the handset being connected to a network. The handset includes a transceiver configured to receive an encoding key from an abstraction server; and a processor connected to the transceiver to receive the encoding key. The processor includes the abstraction function module, wherein the abstraction function module is configured to receive a request from a client or application for providing the sensitive network information from a control plane module of the handset, wherein the client or application resides in a user plane module, which is different from the control plane module, the sensitive network information is stored in the control plane module of the handset, and both the control plane module and the user plane module reside in the handset, retrieve the requested sensitive network information from the control plane module, encrypt the retrieved sensitive network information based on the received encoding key, and provide the encrypted sensitive network information to the client or application in the user plane module.

According to an exemplary embodiment, there is a computer readable medium including computer executable instructions, wherein the instructions, when executed, implement a method for protecting sensitive network information, available in a handset, from disclosure to an unauthorized server, the handset being connected to a network. The method includes providing a system comprising distinct software modules, wherein the distinct software modules comprise an abstraction function module, a control plane module, and a user plane module; receiving at the abstraction function module an encoding key from an abstraction server; receiving at the abstraction function module a request from a client or application for providing the sensitive network information from the control plane module of the handset, wherein the client or application resides in the user plane module, which is different from the control plane module, the sensitive network information is stored in the control plane module of the handset, and both the control plane module and the user plane module reside in the handset; retrieving by the abstraction function module the requested sensitive network information from the control plane module; encrypting, by the abstraction function module, the retrieved sensitive network information based on the received encoding key; and providing the encrypted sensitive network information to the client or application in the user plane module.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims.

Reference throughout the specification to "one embodiment" or "an embodiment" means that a particular feature, structure, or characteristic described in connection with an embodiment is included in at least one embodiment of the present invention. Thus, the appearance of the phrases "in one embodiment" or "in an embodiment" in various places throughout the specification is not necessarily all referring to the same embodiment. Further, the particular features, structures or characteristics may be combined in any suitable manner in one or more embodiments.

According to exemplary embodiments, by introducing an abstraction functionality in the mobile handset, sensitive information (such as that described above) from the control plane can be abstracted and protected from potential abuse. The abstraction functionality may, for example, hide, modify or encode the sensitive information in order to protect it from abuse. According to an exemplary embodiment, not all the information in the control plane is sensitive. Thus, that information from the control plane that is not sensitive may be shared with third parties that have no agreement with the operator of the network. For this case, the abstraction functionality may be configured to determine which information in the control plane is sensitive and which is not sensitive. In addition, the abstraction functionality may be configured to encrypt only the sensitive information from the control plane and not the non-sensitive information.

According to exemplary embodiments described below, the abstraction layer processes information from the control plane in the handset before exposing this information to interfaces as Java or, to the operation system or to clients in the user plane. It is noted that any of the runtime environment Java, the operation system or a client may retrieve sensitive network information from the control plane. The abstraction function may, for example, be connected (always, scheduled or upon request) to a server in the operator's network. If the abstraction is performed by encryption, the server may provide the abstraction function with an encryption key, as will be discussed later. Because services in the operator's network may depend on information available in the control plane, this aspect should be taken into consideration when abstracting the information in accordance with the exemplary embodiments in order to not negatively impact those services. One way to take this into account is to encrypt the information according to an encryption key known by all associated entities in the operator's network in need of the information. Using the OMA SUPL service example described above, the Cell-ID information can be encrypted using an encryption key known by a SUPL client in the handset and then sent to a SUPL server to which the encryption key is communicated.

According to an exemplary embodiment, an abstraction functionality, which may, for example, be considered a middleware, may be located between the handset's control plane and the interfaces and clients which would, otherwise, expose information from the control plane to the user plane. In order to better understand these exemplary embodiments, FIG. 1 illustrates a conceptual view of a typical mobile handset 80 without an abstraction function. Therein, a bottom layer 100 represents the control plane, which provides the core functionality of the mobile handset 80, e.g., communications with the mobile phone via control signalling used to manage the connection, mobility and also some of the basic services (e.g., call control and SMS). On top of the control layer 100 may be the operating system 102, which manages the phone's functionality and provides the interface to functionality for applications and clients in the user plane 104. Clients and/or applications 106, such as browsers, calendar and games, are examples of services implemented in the user plane 104, on top of the operating system 102.

The mobile phones may also include a Java Virtual Machine (JVM) 110. The JVM 110 may run on top of the operating system 102 and enables Java based applications to run on the handset 80. There are various JVMs which are adapted for platforms with different computing capacity and characteristics. One common JVM for mobile handsets is known as the Java Micro Edition, J2ME. J2ME provides a number of application programming interfaces (APIs) for application developers to use when developing applications for mobile handsets.

Thus, the J2ME environment is advantageous for those developers that are not associated with a certain operator but intend to deploy applications on handsets subscribing to a certain operator. The exemplary embodiments describe how to allow these developers to access the sensitive information from the control plane when the operator has a relationship with the operators and how to deny other developers and/or operators to access the information in the control plane when this later developers and/or operators are not authorized to access that data. Java may be used, for example, to reduce the amount of customization of applications associated with different handset models, since the Java APIs used for different handset models are relatively similar to one another.

As mentioned earlier, the user plane 104 is disposed above the operating system 102 and Java 110. The user plane 104 may include one or more applications and/or clients. One difference between a client and an application may be that an application provides a service to the user while the client may perform a function for the network and not a direct service to the user, i.e., the client has a low level functionality to the user. These applications and clients 106 may use the communication channels of the user plane for exchanging data with the operator's network or with third parties. Such communication channels may be General Packet Radio Services (GPRS) and TCP/IP. These channels may be used to communicate with application and content servers 112, inside the operator's network (control domain) or servers 114, which are outside the operator's domain (e.g., Internet servers).

Applications 106 may access information and functionality in the handset 80 either via the operating system 102 or Java 110. Additionally or alternatively, a natively installed client 106, such as an OMA SUPL client, may be provided in the user plane to access information in the control plane. Thus, an application or client 106 in the handset 80 can extract, via APIs in the OS 102 and Java 110, but also by using native clients such as OMA SUPL 106, information from the control plane or invoke functionality and send this to servers 114 outside the operator's network 112.

Figure 2:
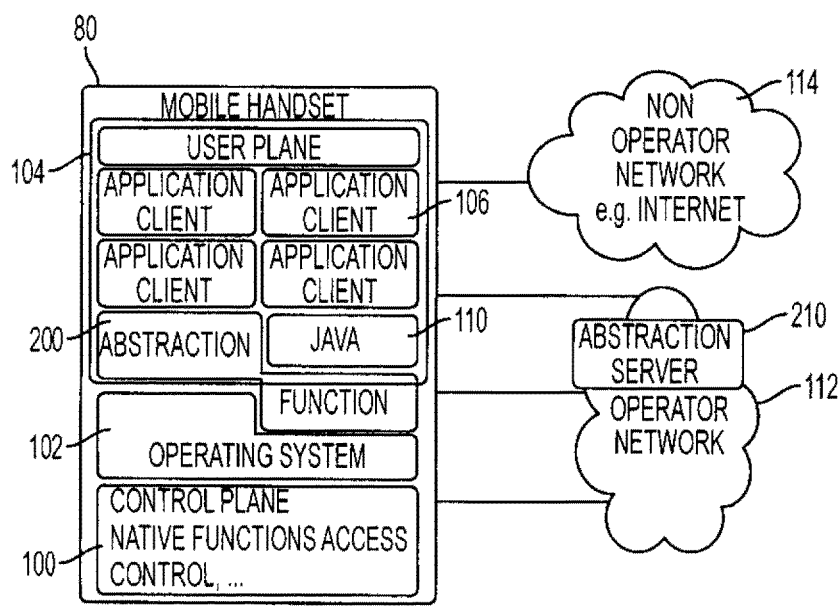
FIG. 2 depicts a conceptual view of a mobile handset with a control plane, a user plane and an abstraction functionality therebetween according to exemplary embodiments.

According to an exemplary embodiment, FIG. 2 shows a mobile handset 80 with an abstraction function 200. The abstraction function 200 is located as a middleware layer between the control plane 100 and the user plane 104, and operates to, for example, process all or part of the information and/or functionality provided to the user plane 104 via the operating system 102 or Java 110 from the control plane 100. The abstraction function 200 may be implemented between the operating system 102 and Java 110. According to another exemplary embodiment, the abstraction function 200 may be implemented between the control plane 100 and the operating system 102 or between the operating system 102 and Java 110 and the user plane 104. Also, the abstraction function 200 may be implemented as a software module in the existing hardware of the handset or as a dedicated hardware module. In one application, the handset may include a smart card that is configured to provide the abstraction function capability. According to this application, the abstraction function is portable, i.e., the user may remove the smart card from the current phone and transfer it to another phone to have the abstraction function available in the new phone. Still according to this application, the abstraction function may be configured specifically for each user and not for each phone, e.g., network information may be sensitive for a client in one country but not sensitive for a client in another country and this is achieved independent of the configuration of the handset because the configuration is implemented via the smart card. A smart card is a piece of hardware that is placed in the handset and the handset is configured to read various protocols and/or instructions from the smart card. The smart card is removable and can be transferred from a handset to another handset. In another application, the smart card may be only software, i.e., a security providing functionality as, for example, the Soft-SIM.

According to an exemplary embodiment, the abstraction function 200 may establish a protecting layer that insulates the control plane 100 from the user plane 104 such that an application or a client 106 from the user plane 104 need to have a permission in order to receive access to information or functionality from the control plane 100. The permission may be implemented as, for example, licenses or other mechanisms for managing authentication and authorization. According to another exemplary embodiment, the abstraction function 200 may use the handset or handset associated information or mechanisms (e.g., SIM-card or hardware identities or Digital Rights Management capabilities) to implement the authentication and authorization.

According to an exemplary embodiment, the handset 80 may connect to an abstraction server 210 in the operator's network, as shown in FIG. 2. This connection may enable the abstraction function 200 to exchange information with the abstraction server 210 such that a coordination of (i) the servers using or requesting information from the control plane of the handset and (ii) the abstraction function existent in the handset may be achieved. More specifically, supposing that the abstraction is performed by encryption, the abstraction server 210 may be used to provide the abstraction function 200 in the handset 80 with a current encryption key. The encryption/processing of the information in the abstraction function 200 may combine information provided from the abstraction server 210 with information from the handset, for example, information from the control plane, the user and also service unique information and capabilities. This may result in an encryption that is unique for the particular handset, user and/or service for a predetermined time period as the encryption is generally valid for the predetermined time period.

The encryption key may be changed as often as desired by the operator of the network, with the consequences that storing the encrypted information and its associated location may not be feasible as a solution for locating handsets, since the mapping between the encrypted information and the position of the handset is valid only for the predetermined period of time. In one application, the abstraction server 210 is configured to automatically change the encryption key at set time intervals or randomly. In another application, if the handset determines that the encryption key is older than a predetermined amount of time, it may request the abstraction server 210 to provide an updated encryption key or to renew the current encryption key.

The abstraction server 210 is shown in FIG. 2 as part of the operator's network. However, according to another exemplary embodiment, the abstraction server 210 may be outside the operator's network as long as the abstraction server 210 preserves the confidentiality of the encryption key according to the policy of the operator of network 112. The abstraction server 210 may be configured, as will be discussed later in more detail, to provide both the handset 80 and the servers (belonging or not to the operator's network) providing services to the handset 80 with coordinated encryption/decryption keys, i.e., for a given predetermined period of time, the handset 80 and a service providing server 114 use matching encryption/decryption keys.

According to an exemplary embodiment, the abstraction server 210 may provide, for a given predetermined period of time, different encryption keys to the same handset 80 for different services that are being used. In other words, if a first external server (a server that does not belong to the network's operator) is providing a first service to the handset 80 and a second external server (also a server that does not belong to the network's operator) is providing a second service to the handset 80, the abstraction server 210 may provide a first encryption key for the handset 80 to communicate with the first server and a second encryption key, different from the first encryption key, for the handset 80 to communicate with the second server, for a same predetermined period of time.

Thus, the abstraction function 200 according to these exemplary embodiments processes information and function queries between the user plane 104 and control plane 100 and may be connected to an abstraction server 210 in the operator's network 112, and the abstraction server 210 may control and instruct the abstraction function 200 regarding how to do the abstraction, e.g., encryption keys to be applied, etc.

Figure 3:
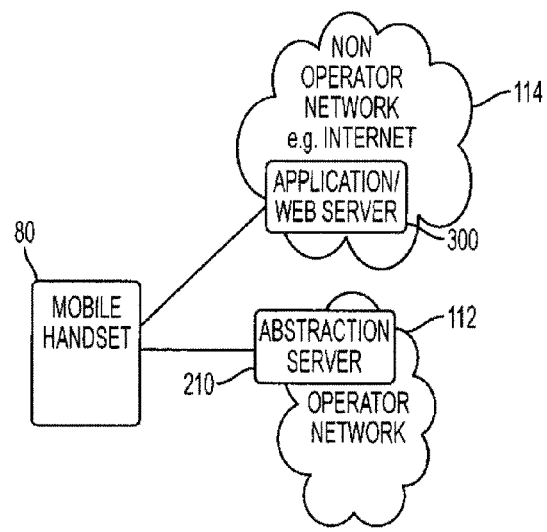
FIG. 3 shows a mobile handset and an application or web service in a non-operator network connected to an abstraction server according to an exemplary embodiment.

The abstraction server 210 would typically also provide the encryption/decryption key to applications, servers and services in the operator network 112 or outside the network 112 to the non-operator network 114, which may be in need of the encrypted information. FIG. 3 illustrates an exemplary architecture with a server 300 on the Internet connected to the abstraction server 210, for providing, e.g., the encryption keys to the applications, servers, and/or services belonging to the non-operator network 114. As the server 300 in the non-operator network 114 obtains information directly from the abstraction server 210 (see path "c") to use in interpreting and decoding the information provided by the mobile handset 80 (see path "a"), the abstraction does not necessarily need to be included in the signaling sequence "b" between the handset 80 and the operator's network 112. This arrangement may result in reduced signaling between the handset 80 and the operator's network 112, thus resulting in saving network and server load and time. In this way, the server 300, which is located outside the operator's network 112, can receive along path "c" information needed to interpret, or adapt to, what is sent along path "a" from or to the mobile handset 80.

To more fully appreciate these exemplary embodiments, two detailed implementation examples will now be described. These examples are not intended to limit the disclosure and/or applicability of the embodiments but only to provide a better understanding of some of the novel features. Both examples are related to the geographical location of the handset, i.e., location information. However, other services that do not use location information may be adapted and/or configured similar to these examples. In the first example, the handset is not provided with an abstraction function 200, while in the second example the handset is provided with the abstraction function 200. More specifically, these examples involve creating a base station Cell-ID plan outside the operator's network. In this scenario, a mobile handset 80 with positioning capabilities (which may be either using the operator's positioning system or a GPS receiver), monitors the Cell-ID value and associates it with the position retrieved by the GPS. The result of this process may be the generation of a database containing Cell-ID values and also the longitude, latitude and altitude of the handset associated with the Cell-ID. When the database is generated by a party outside the operator's network, for plural Cell-IDs, this database may be stored and made available to mobile handsets. Thus, other mobile handsets may use the database to obtain their location without using the operator positioning capabilities or using other capabilities, such as GPS (even though the accuracy of this database is typically lower than a database generated by the network's operator). However, this scenario is not desired by the network operator as the location information of its handsets may be considered to be sensitive information that might be disclosed upon agreement to external parties.

This exemplary scenario includes two aspects. The first aspect is related to the creation of the database discussed above. The second aspect is related to the usage of the database. More specifically, the first aspect is related to reporting network information together with handset location information retrieved from a reference system, in this case the GPS, from the handset to a server for building the database in the server. The second aspect is related to performing a location determination of the mobile handset by using network information to search for the corresponding location information in the database built in the first aspect. Thus, under this scenario, there may be a client on the mobile handset 80 which fetches the network information (in this case Cell-ID) from the control plane. Assume, purely for the purposes of this example, that the client is based on J2ME and the following three exemplary methods may provide location information about the mobile network:

String MobileNetworkCode=System.getProperty("phone.mnc");
% The mobile network code, consisting of a value for the country (e.g. 262 for Germany) and a value for the operator (e.g. 02 for Vodafone) %
String LocationArea=System.getProperty("phone.lai");
% The code for the Location Area where the cell is located, e.g. 1024%
String CellID=System.getProperty("phone.cid");
% 8 digit identity of the cell e.g. 32843107%

According to the methods disclosed above, the client (which resides in the handset 80) may obtain a code for the country in which the handset is located, a value that identifies the operator of the network, a code that identifies a location area of the cell in which the handset is present, and an identity of the cell. There are also methods that may retrieve signal strength and timing advance values from the handset and establish the location information (e.g., geographical position) of the handset based on these values instead of the values disclosed above. The client could also be based on Symbian, which offers even more information via various other methods.

Figure 4:
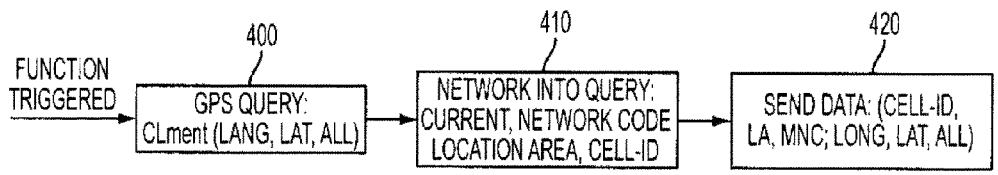
FIG. 4 is a functional diagram illustrating a process of gathering network information and location information in a handset without the abstraction functionality.

Regarding the first aspect discussed above, the client in the mobile handset 80 may execute three functions for generating the database, which are illustrated in FIG. 4. A first function 400 is related to obtaining current location information of the handset 80 using the GPS (which may be built in the handset or connected to the handset via e.g. Bluetooth). A second function 410 is related to obtaining the network information, which is generally achieved by retrieving information from the control plane 100 of the handset 80, via a Java interface. According to an exemplary embodiment, such network information may include information about the country code MobileNetworkCountrycode, information about the location area of the cell LocationArea, and the Cell-ID of the cell. A third function 420 is related to managing a connection of the handset 80 to the server 114 (typically predetermined IP-address/URL) on the Internet or other network and reporting the network information and the location information (which may include longitude, latitude, and/or altitude) retrieved from the GPS. This information may be stored in the database managed by the server 114. As the network information may be representative of an area rather than a point defined by the longitude, latitude, and altitude of the handset retrieved from the GPS, the server 114 may perform a transformation mapping the points (location of handsets) to areas to be represented by the particular network information. In this scenario, in which the network information with the highest granularity is the Cell-ID, the server 114 may create a model with the approximate geographical coverage area for the real cell belonging to the operator of network 112.

The trigger of the functions discussed above may be, for example, the start of a client or an action by an end user. In the aspect shown in FIG. 4, the server 114 may populate the database with the information reported by the clients in the mobile handset and also may store and/or maintain the database.

Figure 5:
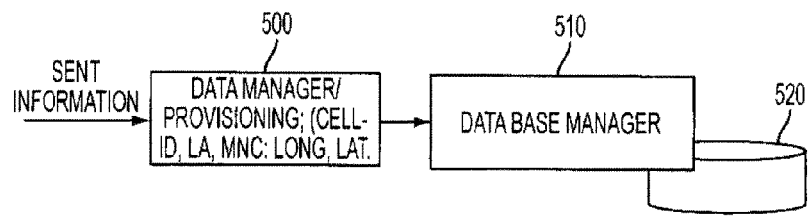
FIG. 5 is a functional diagram illustrating a process of receiving the network information and the location information in a server.

A function performed by the server 114 in response to receiving position information from the handset 80 is illustrated in FIG. 5. According to this aspect, a data manager provided in the server 114 receives in step 500 the information from the handset 80 and provides this information to, for example, a database manager for storing in step 510 this information in a predetermined format, i.e., building the database 520.

Figure 6:
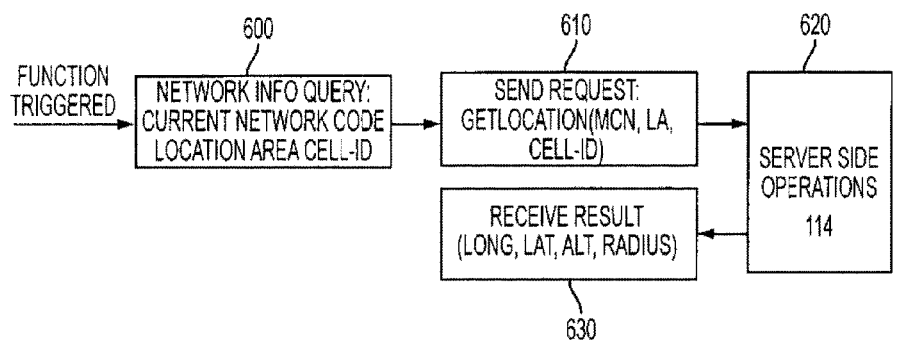
FIG. 6 is a functional diagram illustrating a process of requesting location information of the handset based on its network information.

When the mobile handset 80 queries the database 520 for determining its location information, the handset may use, for example, the network 112 information as a key, to send the query to server 114. Thus, as shown in FIG. 6, a client of the handset 80 may obtain in step 600 the network information (which may include the MobileNetworkCountrycode, LocationArea and Cell-ID) via a Java interface and send this information in step 610 to server 114 with a request for providing the position information corresponding to the network information. The server 114 receives the network information and manages, during a step 620, a process of searching the database 520 for determining the location information of the handset 80. The server 114 provides the determined location information to the handset 80 in step 630 such that the handset 80 receives an answer to its query, i.e., an answer that includes, for example, the longitude, the latitude and/or the altitude of the handset 80. Optionally, the server 114 may provide a radius of the cell, if the Cell-ID method is used to determine the radius. If other methods are used for determining the radius, the radius is calculated based on various parameters, for example, in GPS the radius is about 10 m.

Figure 7:
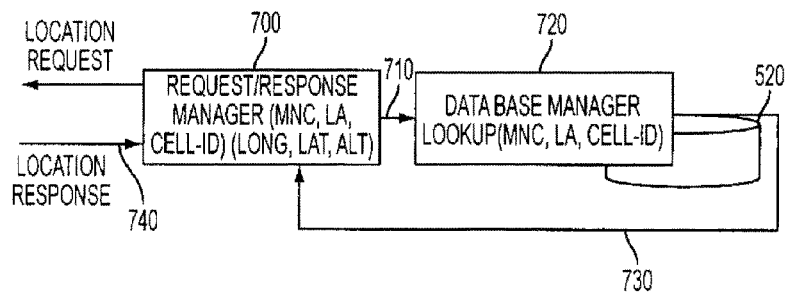
FIG. 7 is a functional diagram illustrating a process of searching for the location information in the server.

The process described in step 620 in FIG. 6 as taking place in the server 114 is illustrated in more details in FIG. 7. According to an exemplary embodiment, a request/response manager 700 in server 114 receives a location request, which may include the network information from the handset 80, and distributes the network information in step 710 to a database manager 720. The database manager 720 searches the database 520 for the location information of the handset 80 matching the received network information. After the location information of the handset 80 is determined, the database manager 720 informs in step 730 the request/response manager 700 about this information. The request/response manager 700 provides the location information to the handset 80 in step 740.

It is noted that no encryption is performed in the processes described with regard to FIGS. 4-7 and thus, the network information obtained by the client of the handset from the control plane 100 may be accessed by a third party server 114 that is not authorized by the operator of network 112 to access that information.

Having described this example for a mobile handset without an abstraction function 200, e.g., such as the mobile handset 80 shown in FIG. 1, this example is next discussed for a mobile handset having the abstraction function 200, e.g., such as the mobile handset 80 shown in FIG. 2. If the handset is equipped with the abstraction function 200, in addition to providing a beneficial security function, such an abstraction function 200 has the potential to interfere with the interface between the user plane application or client 106 and the information (in this case the network information) in the control layer 100, causing authorized services or clients to not being able to perform their tasks. Thus, the scenario presented above for creating a base station Cell-ID plan, outside the operator's network, may be impaired. If, however, the abstraction function 200 encrypts of the network information in such a form that server 114 is able to decrypt it, then the method illustrated in FIGS. 4-7 may still be used.

Accordingly, the following describes an exemplary technique for creating a base station Cell-ID plan outside the operator's network, but with an abstraction function 200 on the handset and an abstraction server 210 in the network 112. According to this exemplary embodiment, it is assumed that the outside server managing and hosting the location information, e.g., the location mapping database, and providing the location of a handset as a function of the network information, has a business relation with the operator and has access to the decryption key from the abstraction server 210. Such an outside server may be server 300 shown in FIG. 3.

With regard to FIGS. 8-11, those steps or parts of the steps for generating the database and for providing the location information of a handset when using the abstraction function 200, which are similar to those shown in FIGS. 4-7 are not repeated herein. However, some of the novel features shown in FIGS. 8-11 are discussed next.

Figure 8:
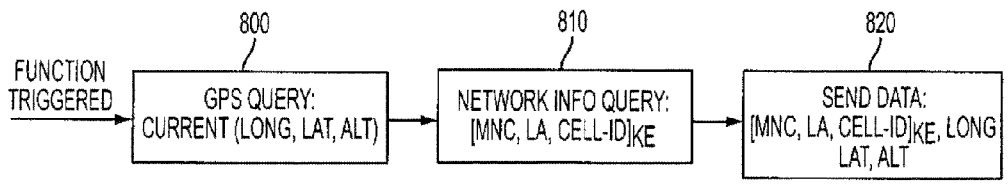
FIG. 8 is a functional diagram illustrating a process of gathering network information and location information in a handset with the abstraction functionality according to an exemplary embodiment.

As shown in FIG. 8, after the GPS information is gathered in step 800, the handset 80 gathers the network information in step 810, encrypts the network information and sends the encrypted network information and the GPS information to the application or client of the user plane 104. Thus, the network information retrieved from the control plane 100 by the abstraction function 200 is not the [Current Mobile Network Code, Location Area, Cell-ID] (also referred to as [MNC, LA, Cell-ID]), but is instead the encrypted network information. Thus, it can be seen that both steps 810 and 820 include the network information in an encrypted form to protect this information from unauthorized third parties. To obtain the correct network information, the encrypted information must be decrypted with a valid decrypting key.

For the following discussion, the syntax that will be used is:
The network information [MNC, LA, Cell-ID] is encrypted using the encryption key KE and the encrypted network information is denoted as: [MNC, LA, Cell-ID]$_{KE}$.
Hence, $$[MNC, LA, Cell-ID]_{KE} = E([MNC, LA, Cell-ID], KE),$$

where E is the encryption algorithm. To obtain the correct network information, the encrypted information needs to be decrypted with a valid decryption key. Thus, the correct decrypted network information [MNC, LA, Cell-ID] is given by:

$$[MNC, LA, Cell-ID] = D([MNC, LA, Cell-ID]_{KE}, KD),$$

where D is the decrypting algorithm and KD is the decryption key. Note that the result of the decryption does not necessarily have to be the actual network information per se. For example, the result of the initial decryption can still be encrypted, but encrypted according to a more static schema, so that the result is the same even though the encryption key KE is changed. More specifically, for positioning purposes, the full cell global identity (CGI) string is not needed but only a unique identifier of the cell-site. Because the CGI might be sensitive information, the CGI may be encoded to hide the sensitive information. Then, the encoded CGI information may be used for positioning purposes. This approach may be an advantageous way for the operator to protect its network information from outside entities while still enabling services such as the location determination service used as an example here.

Figure 9:
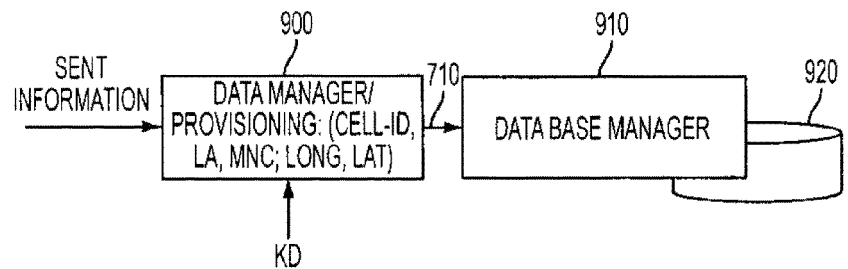
FIG. 9 is a functional diagram illustrating a process of receiving encrypted network information and the location information in a server according to an exemplary embodiment.

The server 114 that builds the database performs the steps illustrated in FIG. 9. The information received from the handset 80 is decrypted by the data manager/provisioning module 900 based on the decrypting key KD received from the abstraction server 210. The database manager 910 uses the decrypted information for building database 920.

Figure 10:
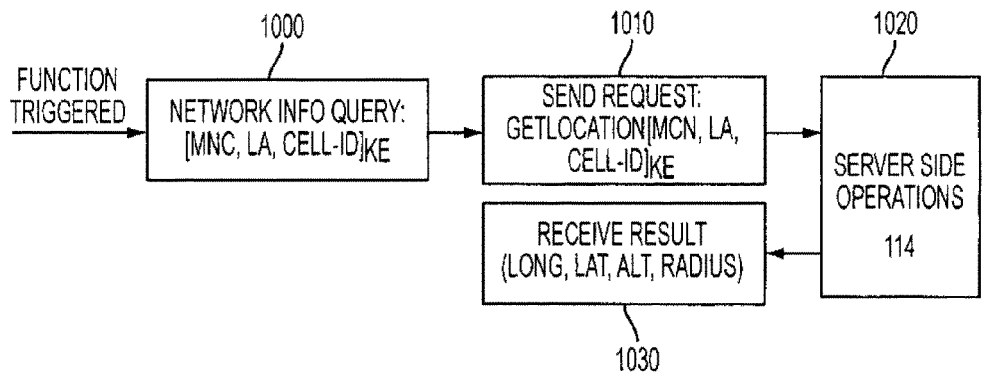
FIG. 10 is a functional diagram illustrating a process of requesting location information of the handset based on its encrypted network information according to an exemplary embodiment.

FIG. 10 illustrates how a function triggers an application or a client of the handset 80 to inquire in step 1000 about the network information from the control plane 100, and send a request in step 1010 requesting the location information of the handset to the server 114. Both steps 1000 and 1010 use the network information encrypted. The server 114 determines in step 1020 the location information of the handset 80, assuming that server 114 has the decryption key KD, and the handset 80 receives in step 1030 the requested location information.

Figure 11:
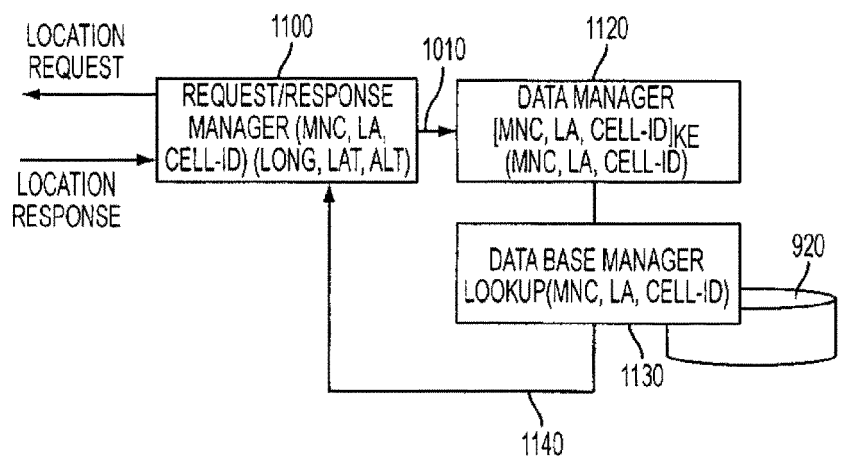
FIG. 11 is a functional diagram illustrating a process of searching for the location information in the server based on decrypted network information according to an exemplary embodiment.

The processes performed in step 1020 are shown in more details in FIG. 11. The request/response manager 1100 receives the encrypted network information from the handset 80. This information is provided in step 1110 to the data manager 1120, which decrypts the network information based on the decryption key KD. Based on the received decrypted network information, the database manager 1130 searches the database 920 for determining the position information of the handset 80. The position information is sent in step 1140 to the request/response manager 1100, which sends this information to the handset 80. The decryption key used by the data manager 1120 may be obtained from the operator's abstraction server 210.

Figure 12:
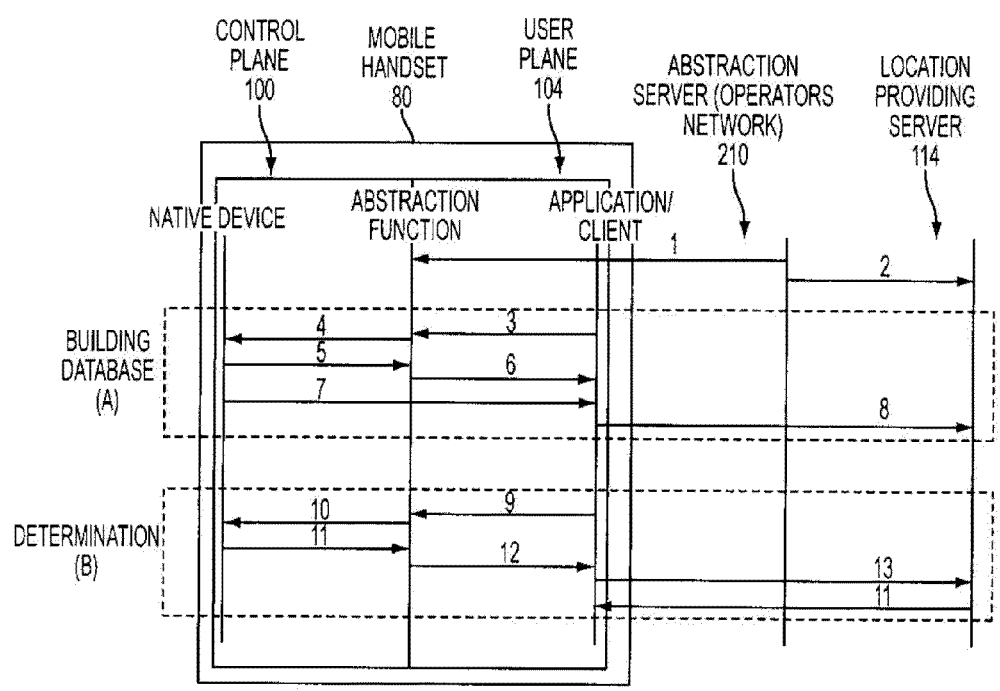
FIG. 12 is a diagram illustrating signals exchanged between various components of the handset and server according to an exemplary embodiment.

For completeness, an exemplary signaling diagram associated with the two cases (building the database and using the database to provide location determination) is illustrated in FIG. 12. Therein, the steps numbered 1-14 are described below. Steps 1-8 are related to the generation of the database and steps 9-14 are related to the usage of the database. A series of steps related to building the database are marked as "A" and another series of steps related to using the database are marked as "B."

Regarding building the database, the abstraction server 210 may provide the abstraction function 200 with the encryption key KE in step 1. Simultaneously or later in time, the abstraction server 210 may provide in step 2 the location providing server 114 with the corresponding decryption key KD. If the encryption key KE is changed by the abstraction server 210, the abstraction server is configured to automatically update the decryption key KD in the location providing server 114. In step 3, a client 106 may request network information and GPS location from various planes of the handset 80. While the network information is located in the control plane 100, the GPS information may be available either in the control plane 100, in the user plane 104, or in another plane. The request of step 3 is handled via the abstraction function 200. The abstraction function forwards in step 4 the request to the native device API. The network information (MNC, LA, Cell-ID) is retrieved by the abstraction function 200 in step 5 and encrypted. Thus, the encrypted network information ([MNC, LA, Cell-ID]$_{KE}$) is provided in step 6 to client 106. Later in time or simultaneously with step 6, the GPS information is provided in step 7 to client 106. The GPS information, i.e., location information, may be provided unencrypted by the abstraction function 200 to the client or application 106 after the abstraction function 200 determines that the location information is not sensitive network information. In one application, the client 106 retrieves the location information independent of the abstraction function 200, i.e., directly from a location in the handset 80 where the location information is stored. Client 106 may use the received information, i.e., encrypted network information and non-encrypted location information, to send it to server 114 in step 8.

Therefore, server 114 may use the encrypted network information if the server 114 has a decryption key KD or otherwise the network information cannot be extracted from the encrypted network information. In this way, an unauthorized server that is not part of the operator's network 112 or does not have an agreement with the operator of the network 112, cannot extract the network information, i.e., the sensitive information. By using this process with the abstraction function implemented in the handset, the security of the sensitive network information is achieved and the activities of the third party servers that have agreements with the operator of the network are not affected by the encryption process.

According to another exemplary embodiment, the steps performed by a client or application 106 for determining the location information of the handset 80 is discussed with regard to section B of FIG. 12. In step 9, the location determination client 106 requests network information from the control plane 100. The request is handled by the abstraction function 200, as all other requests from the user plane 104 to the control plane 100. The abstraction function 200 forwards in step 10 the request to the native device API for obtaining the network information from the control plane 100. The network information (MNC, LA, Cell-ID) is retrieved by the abstraction function 200 in step 11 and encrypted. The encrypted network information ([MNC, LA, Cell-ID]$_{KE}$) is provided by the abstraction function 200, in step 12, to client 106. Client 106 sends in step 13 a request for location information to server 114. The request includes at least the encrypted network information ([MNC, LA, Cell-ID]$_{KE}$). After the server locates in its database the position information of the handset 80 that corresponds to the received encrypted network information, the client 106 receives in step 14 the position information of the handset 80, which identifies an area corresponding to the decrypted network information (MNC, LA, Cell-ID). Server 114 is able to return the corresponding area of the handset 80 as the server 114 has the decryption key KD, received in step 2 in FIG. 12, from the abstraction server 210.

Figure 13:
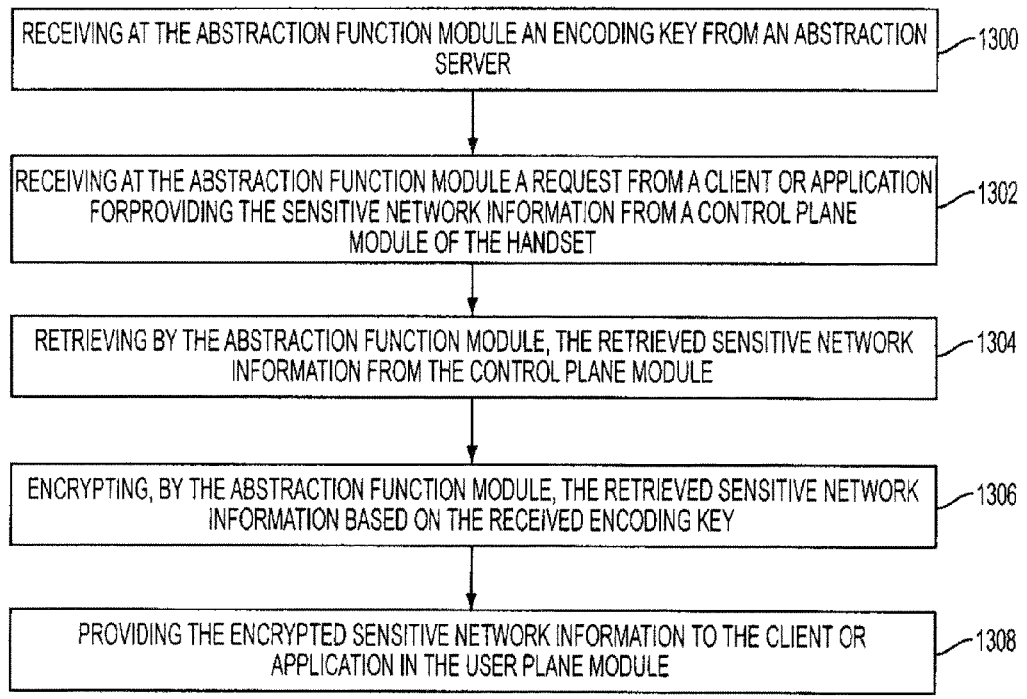
FIG. 13 is a flow chart illustrating steps of a method for providing encrypted network information according to an exemplary embodiment.

According to an exemplary embodiment, a method for protecting sensitive network information, available in the handset, from disclosure to an unauthorized server, by using an abstraction function module, is described with reference to FIG. 13. The method includes a step 1300 of receiving at the abstraction function module an encoding key from an abstraction server, a step 1302 of receiving at the abstraction function module a request from a client or application for providing the sensitive network information from a control plane module of the handset, wherein the client or application resides in a user plane module, which is different from the control plane module, the sensitive network information is stored in the control plane module of the handset, and both the control plane module and the user plane module reside in the handset, a step 1304 of retrieving by the abstraction function module the requested sensitive network information from the control plane module, a step 1306 of encrypting, by the abstraction function module, the retrieved sensitive network information based on the received encoding key, and a step 1308 of providing the encrypted sensitive network information to the client or application in the user plane module.

Figure 14:
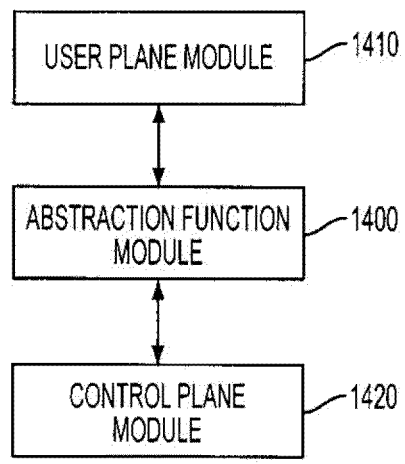
FIG. 14 is a schematic diagram indicating various modules of the handset according to an exemplary embodiment.

The modules discussed above are shown, in an exemplary embodiment, in FIG. 14. The abstraction function module 1400 is connected to the user plane module 1410 and to the control plane module 1420. These modules implement the functionality of the abstraction function 200, control plane 100 and user plane 104 shown in FIG. 2. These modules are configuring at least a processor and/or a memory of the handset 80 to achieve the functionalities discussed with regard to FIGS. 2-13.

Thus, it will be appreciated that the foregoing exemplary embodiments describe devices, systems and techniques associated with generating, based on data encrypted by an abstraction functionality, a database in a server external to a network to which a handset belongs, and/or a function for providing information from the database to a mobile terminal, handset or device without disclosing to unauthorized parties sensitive network information. Although the above exemplary embodiments have been discussed in the context of providing location information to a handset, those skilled in the art would appreciate that the novel techniques and mechanisms for building and using the database are not limited to only providing location information.

Figure 15:
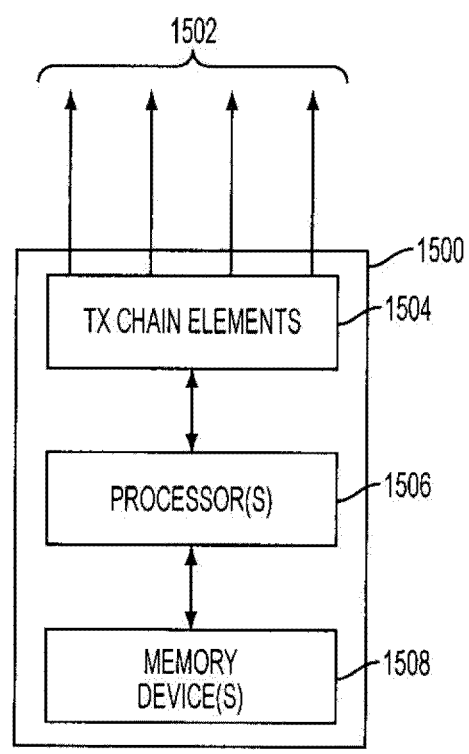
FIG. 15 shows a mobile handset according to an exemplary embodiment.

Terminals, handsets or devices that were discussed above may, for example, be represented generally by the block diagram illustrated in FIG. 15. Therein, the mobile handset includes one or more physical transmit antennas 1502 in this example numbering four, although more or fewer than four transmit antennas can be used. The physical transmit antennas 1502 are connected to a processor 1506 via transmit (TX) chain elements 1504 which can include one or more of filters, power amplifiers and the like, as will be appreciated by those skilled in the art. The transmit chain elements 1504 may be part of a transceiver, that is configured to transmit and receive signals. Processor(s) 1506, in conjunction with memory device(s) 1508 (and potentially other devices not shown) can operate to provide the abstraction function or layer 200 discussed above, e.g., by way of software stored therein, additional hardware or some combination of software and hardware. Thus, the abstraction layer functionality described above can, for example, be performed in software by executing computer-readable instructions from memory device 1508 to perform the encryption or other techniques described above.

Thus, it will be apparent that exemplary embodiments also relate to software, e.g., program code or instructions which are stored on a computer-readable medium and which, when read by a computer, processor or the like, perform certain steps associated with transmitting information signals which are abstracted or hidden in the manner described above.

Systems and methods for processing data according to exemplary embodiments of the present invention can be performed by one or more processors executing sequences of instructions contained in a memory device. Such instructions may be read into the memory device from other computer-readable mediums such as secondary data storage device(s). Execution of the sequences of instructions contained in the memory device causes the processor to operate, for example, as described above. In alternative embodiments, hard-wire circuitry may be used in place of or in combination with software instructions to implement the present invention.

Numerous variations of the afore-described exemplary embodiments are contemplated. The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims. No element, act, or instruction used in the description of the present application should be construed as critical or essential to the invention unless explicitly described as such. Also, used herein, the article "a" is intended to include one or more items.

What is claimed is:

1. A method for protecting sensitive network information, available in a handset, from disclosure to an unauthorized server, by using an abstraction function module, the handset being connected to a network, the method comprising:
   receiving at the abstraction function module an encoding key from an abstraction server;
   receiving at the abstraction function module a request from a client or application for providing the sensitive network information from a control plane module of the handset, wherein the client or application resides in a user plane module, which is different from the control plane module, the sensitive network information is stored in the control plane module of the handset, and both the control plane module and the user plane module reside in the handset;
   retrieving by the abstraction function module the requested sensitive network information from the control plane module;
   encrypting, by the abstraction function module, the retrieved sensitive network information based on the received encoding key; and
   providing the encrypted sensitive network information to the client or application in the user plane module.

2. The method of claim 1, further comprising:
   receiving by the abstraction function module a request from the client or application for location information of the handset;
   determining that the location information of the handset is not sensitive network information; and
   providing the location information to the client or application without encrypting the location information.

3. The method of claim 2, further comprising:
   transmitting the encrypted network information and the unencrypted location information from the handset to a third party server that is outside the network.

4. The method of claim 2, wherein the location information includes at least one of longitude, latitude, or altitude of the handset.

5. The method of claim 1, wherein the sensitive network information includes at least one of information about the country code, information about a location area of a cell in which the handset is present, a cell-ID of the cell, or information related to a neighbor list of the cell.

6. The method of claim 1, further comprising:
   managing communications between the control plane module and the user plane module by an operating system; and
   interposing the abstraction function module between (i) the control plane module and the operating system and (ii) the user plane module such that all communications between (i) and (ii) is handled by the abstraction function module.

7. The method of claim 1, further comprising:
   transmitting the encrypted network information from the handset to a third party server that has an agreement with the network and receives a decrypting key from the abstraction server, which is controlled by the network, such that the third party server decrypts, based on the decrypting key, the encrypted network information from the handset.

8. The method of claim 7, further comprising:
   receiving from the third party server location information of the handset based on the transmitted encrypted network information.

9. A handset configured to protect sensitive network information, available in the handset, from disclosure to an unauthorized server, by using an abstraction function module, the handset being connected to a network, the handset comprising:
   a transceiver configured to receive an encoding key from an abstraction server; and
   a processor connected to the transceiver to receive the encoding key, the processor including the abstraction function module, wherein the abstraction function module is configured to
   receive a request from a client or application for providing the sensitive network information from a control plane module of the handset, wherein the client or application resides in a user plane module, which is different from the control plane module, the sensitive network information is stored in the control plane module of the handset, and both the control plane module and the user plane module reside in the handset,
   retrieve the requested sensitive network information from the control plane module,
   encrypt the retrieved sensitive network information based on the received encoding key, and
   provide the encrypted sensitive network information to the client or application in the user plane module.

10. The handset of claim 9, wherein the abstraction function module is further configured to:
   receive a request from the client or application for location information of the handset;
   determine that the location information of the handset is not sensitive network information; and provide the location information to the client or application without encrypting the location information.

11. The handset of claim 10, wherein the transceiver is further configured to:
   transmit the encrypted network information and the unencrypted location information from the handset to a third party server that is outside the network.

12. The handset of claim 10, wherein the location information includes at least one of longitude, latitude, or altitude of the handset.

13. The handset of claim 9, wherein the sensitive network information includes at least one of information about the country code, information about a location area of a cell in which the handset is present, a cell-ID of the cell, or information related to a neighbor list of the cell.

14. The handset of claim 9, further comprising:
   an operating system configured to manage communications between the control plane module and the user plane module; and
   the abstraction function module is interposed between (i) the control plane module and the operating system and (ii) the user plane module such that all communications between (i) and (ii) is handled by the abstraction function module.

15. The handset of claim 9, wherein the transceiver is further configured to:
   transmit the encrypted network information from the handset to a third party server that has an agreement with the network and receives a decrypting key from the abstraction server, which is controlled by the network, such that the third party server decrypts, based on the decrypting key, the encrypted network information from the handset.

16. The handset of claim 15, wherein the transceiver is further configured to:
   receive from the third party server location information of the handset based on the transmitted encrypted network information.

17. A non-transitory computer readable medium including computer executable instructions, wherein the instructions, when executed, implement a method for protecting sensitive network information, available in a handset, from disclosure to an unauthorized server, the handset being connected to a network, the method comprising:
   providing a system comprising distinct software modules, wherein the distinct software modules comprise an abstraction function module, a control plane module, and a user plane module;
   receiving at the abstraction function module an encoding key from an abstraction server;
   receiving at the abstraction function module a request from a client or application for providing the sensitive network information from the control plane module of the handset, wherein the client or application resides in the user plane module, which is different from the control plane module, the sensitive network information is stored in the control plane module of the handset, and both the control plane module and the user plane module reside in the handset;
   retrieving by the abstraction function module the requested sensitive network information from the control plane module;
   encrypting, by the abstraction function module, the retrieved sensitive network information based on the received encoding key; and
   providing the encrypted sensitive network information to the client or application in the user plane module.

18. The non-transitory computer readable medium including computer executable instructions which, when executed, implement the method of claim 17, further comprising:
   receiving by the abstraction function module a request from the client or application for location information of the handset;
   determining that the location information of the handset is not sensitive network information; and
   providing the location information to the client or application without encrypting the location information.

19. The non-transitory computer readable medium including computer executable instructions which, when executed, implement the method of claim 17, further comprising:
   transmitting the encrypted network information from the handset to a third party server that has an agreement with the network and receives a decrypting key from the abstraction server, which is controlled by the network, such that the third party server decrypts, based on the decrypting key, the encrypted network information from the handset.

20. The non-transitory computer readable medium including computer executable instructions which, when executed, implement the method of claim 17, further comprising:
   receiving from the third party server location information of the handset based on the transmitted encrypted network information.

* * * * *